July 6, 1926.

E. H. LICHTENBERG 1,591,849

STEERING CONTROL FOR ROTARY CRANES

Filed Feb. 16, 1924  2 Sheets-Sheet 1

Witness:
E. H. Wagner

Inventor
E. H. Lichtenberg

By Robt. Robt. Stiel
Attorneys

July 6, 1926. 1,591,849
E. H. LICHTENBERG
STEERING CONTROL FOR ROTARY CRANES
Filed Feb. 16, 1924 2 Sheets-Sheet 2
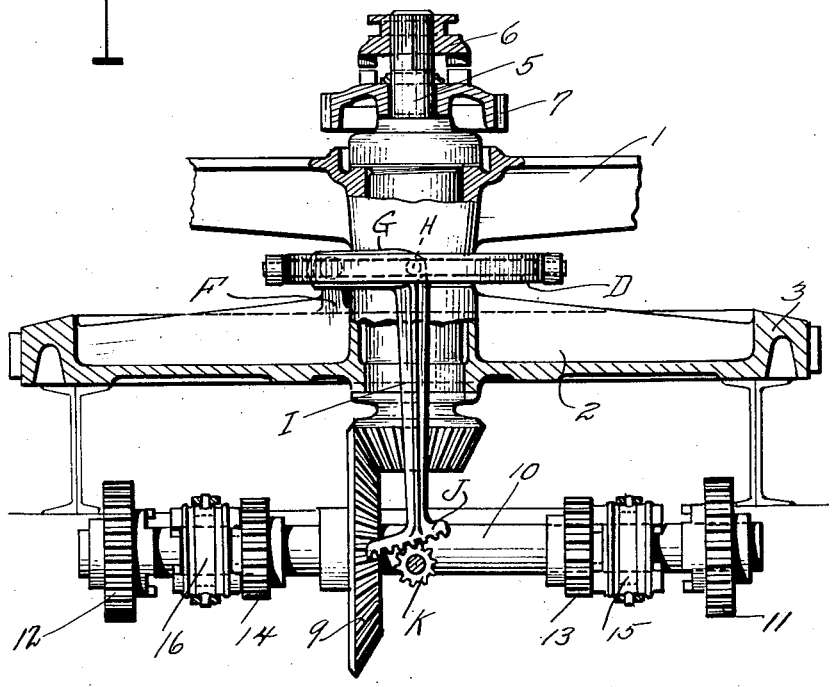
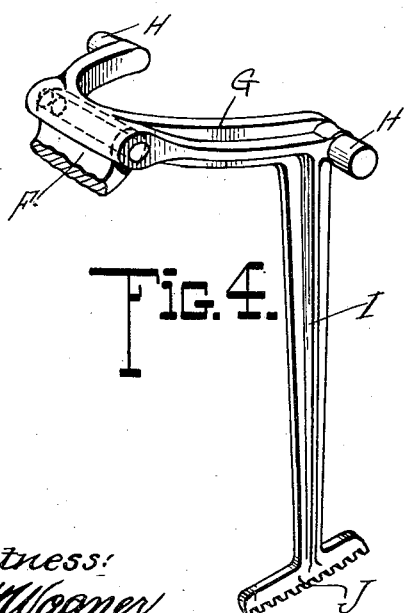
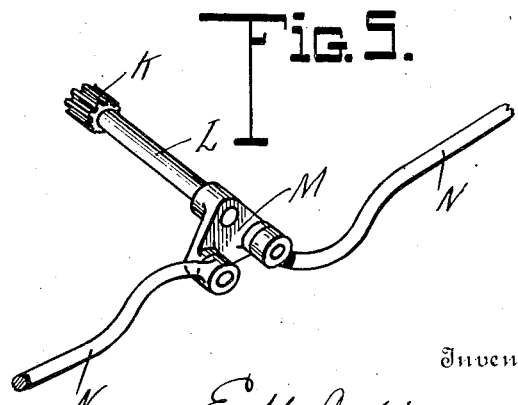

Patented July 6, 1926.  1,591,849

UNITED STATES PATENT OFFICE.

ERICH H. LICHTENBERG, OF MILWAUKEE, WISCONSIN, ASSIGNOR TO KOEHRING COMPANY, OF MILWAUKEE, WISCONSIN, A CORPORATION.

STEERING CONTROL FOR ROTARY CRANES.

Application filed February 16, 1924. Serial No. 693,160.

This invention has to do with rotary cranes of the type generally used today for excavating purposes. These cranes comprise what may be termed a traction base mounted on endless traction devices or belts and supporting a rotary car or turn table which carries the power plant and the excavating instrumentalities with their controls.

The mechanism of this invention involves a conveniently operable device whereby an operator who usually stands on the car or rotary body of the crane may control the direction of travel and the speed of travel of the machine through proper operation of the endless traction device.

It is well known in the art of tractors and cranes, as exemplified by Holt Patent 1,008,338 issued Nov. 14, 1911, that a driving of endless traction members at the same speed, in cranes of the type of the invention, will compel a movement of the machine in what may be termed a straight line. By causing the traction members to rotate at different relative speeds, turning or steering movements of the machine may be caused, the direction of turning being toward the side of the machine at which the traction device of least speed or lesser driving ratio is operating; or again, it is common in the tractor art to stop one of the traction devices in its operation, or reverse it in its movement, whilst the other one continues to turn forward and thereby effect turning operations.

Since the operator and the power plant and control mechanism for the traction device are all supported on the rotary body or turn table of the machine, it is customary for the control devices to have connections which pass through, or are otherwise coaxial with, the main center pin or turning axis for said turn table or rotary body. The present invention involves a novel mechanism in association with the center pin axis and in association with a driving shaft that passes through the center pin whereby the endless traction members may be controlled in their operation to move at the same speed, or at different ratios of speed to effect forward or rearward movement of the machine or turning movements.

The invention is fully illustrated in the accompanying drawings in which

Fig. 3 is a sectional view like Fig. 1 but taken at a right-angle thereto.

Fig. 4 is a detailed perspective view of the lower gear shift yoke lever.

Fig. 5 is a perspective view of the operating shaft for the gear shifting levers and the connecting links or rods intermediate said shafts and the said levers.

Figure 1:
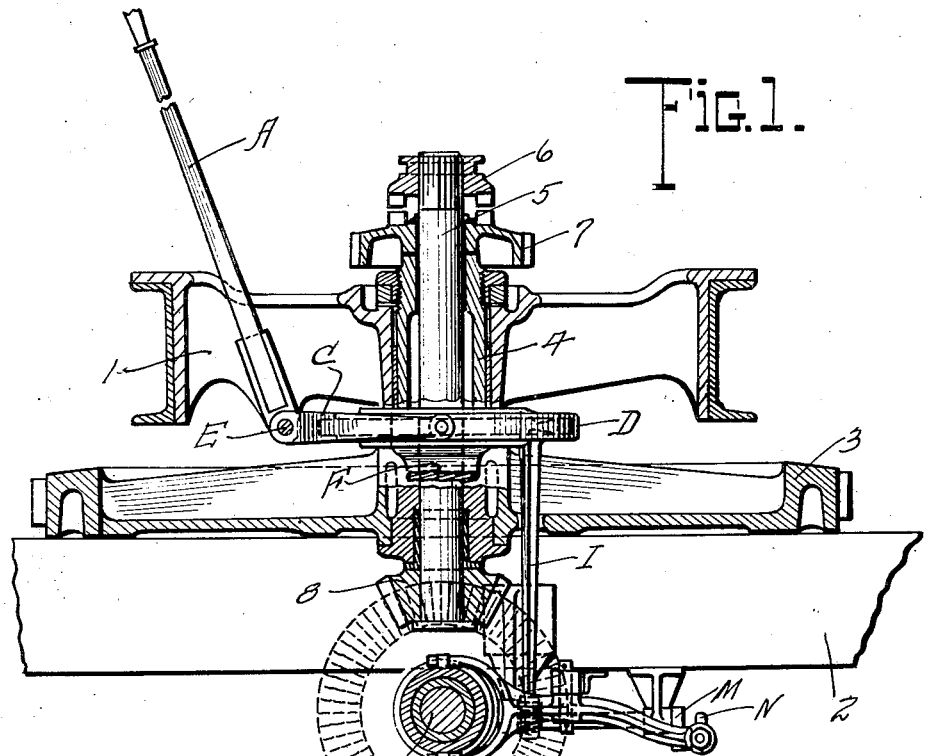
Fig. 1 is a sectional view of the turn table and traction base features of a rotary crane, and illustrating the control devices of the invention applied thereto; in this view the endless traction devices supporting the crane are omitted as they are conventional and a number of types of this crane controlled mechanism have been heretofore proposed in the art.
Figure 2:
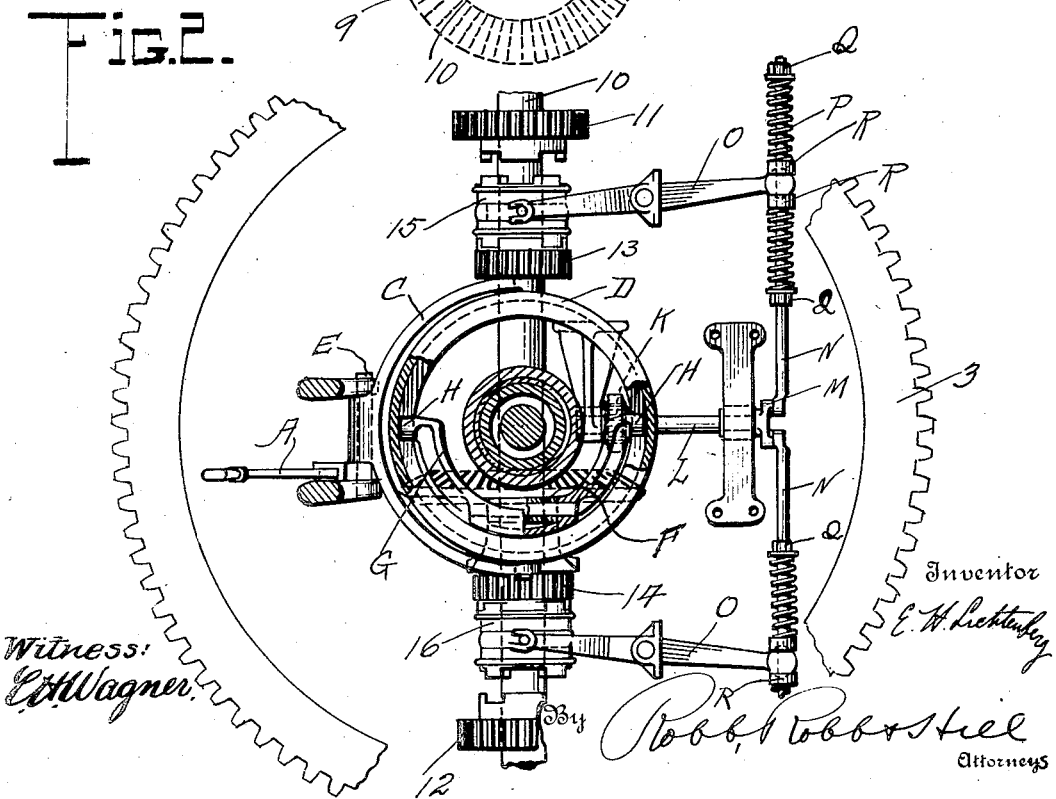
Fig. 2 is a somewhat fragmentary horizontal sectional view of the parts of Fig. 1 and bringing out more clearly the features of mounting of the parts and the driving gears.

In setting forth my invention I propose to ignore both by illustration and description the general features of the crane as regards the excavating means and the power plant and other controls that are mounted usually on the turn table or rotary car body 1. This turn table 1 is mounted in the wellknown manner on the traction base 2, which embodies a frame equipped with endless traction devices or multiplanes of any well-known type. The rotation of the turn table or body 1 on the base 2 is effected in the customary way through an operating shaft and pinion, not illustrated, the pinion engaging what is known as the ring gear 3 carried by the base 2.

The axis of the turn table 1 is the customary hollow center pin 4, the peculiar mounting and bearings for which are immaterial and may be conventional. Through the center pin 4 passes the driving shaft 5 which may be driven by an engine of the steam or explosive type, which may constitute the power plant and be mounted upon said turn table 1 in the car which is usually supported upon the latter. Any suitable clutch and gear driving mechanism, as shown at 6 and 7 at the upper end of the shaft 5, may be employed for driving the same. At its lower end the shaft 5 is equipped with a driving bevel gear 8, engaging a corresponding gear 9 mounted upon a driven shaft 10 on which shaft are carried the loosely mounted high speed gears 11 and 12 and low speed gears 13 and 14.

Intermediate the pair of gears 11 and 13, clutch member 15 is splined to the shaft 10 and comprises opposite jaw clutches adapted to engage jaw clutches carried by the gears 11 and 13. In like manner intermediate the gears 12 and 14 a clutch member 16 is splined to the shaft 10 and provided with opposite clutch members engageable with clutch members carried by the gears 12 and 14. The low and high speed gears illustrated are adapted to engage with other gears not shown in order to transmit to the endless traction members, not shown, either high speed movements at the same driving ratios, low speed movements at the same driving ratios, thus compelling straight line movements; or by engaging the clutch member 15 with the high speed gear 11 and the clutch member 16 with the low speed gear 14, a turning movement of the machine in the direction of the low speed driven endless traction member will be compelled. The opposite action turning in the opposite direction may be caused by engaging the clutch member 15 with the low speed gear 13 and the clutch member 16 with the high speed gear 12.

I do not specifically show and describe the full gearing arrangements used in my invention because the same are illustrated in the co-pending application for patent of Vincent B. Groff, Serial No. 603,225, filed November 25, 1922 for speed transmission mechanism, and I also make reference in this connection to the patent of Loitron, No. 901,456, issued October 20, 1908, which patent shows a type of gearing corresponding with that of the Groff application.

It being understood, therefore, that the power plant of the turn table 1 is adapted to drive the endless traction members supporting the base 2 through the shaft 5 and the gearing which has just been described, to operate the traction members at uniform speeds or different speeds, it remains for me to set forth my novel control means whereby I utilize a single lever upon the turn table 1 to actuate the clutches 15 and 16 and cause the various uniform and relative movements of the endless traction members as above outlined.

Pivoted to the turn table or rotary support or car, is the lever A rigid with and therefore adapted to raise and lower a yoke C. The yoke C is movable up and down and has its opposite side portions engaged with and carrying a ring D. The ring D is formed with an internal channel and said ring is virtually adapted to swing from the pivot axis E of the lever A. Projecting upwardly from the ring gear D is a bracket F which has pivotally mounted thereon the arc shaped yoke G equipped with the outwardly projecting pivots H at its extremities. The pivots H enter the internal groove in the ring D, the yoke G is formed with an integral lever I and the two together make a yoke lever, practically speaking. The lever I is equipped at its lower end with a gear sector or rack J in engagement with a pinion K on an operating shaft L.

The shafe L is provided with a rigid triangular actuating head M to which are pivotally connected the adjustment heads or rods N that pass through and connect with the clutch shifting levers O, the latter having forks which engage the clutches 15 and 16 in an obvious manner. The connection between the rods N and the levers O is elastic to the extent that springs are located on the rods N on opposite sides of the point of connection or pass through the rods with respect to the levers O. The springs P engage fixed abutments Q on each rod N and movable abutments R, also on each rod, and center the levers O as regards their points of connection in an obvious manner and for reasons presented in the aforesaid Groff application.

The head M may be actuated by the yoke lever G—I to assume neutral and effect other positions to cause the clutches 15 and 16 in one position to engage the high speed gears, in a second position to engage the low speed gears, in a third position to engage one with a high speed gear and the other with a low speed gear, and in a fourth position to reverse the adjustment described as a third position.

In the operation of the device it is obvious that by movement of the handle or lever A to any one of its various positions, the ring D may be raised or lowered to thereby act upon the yoke lever G—I to shift the latter in one direction or other different increments of movement and thus effect the desired result of operating the endless traction members at different speeds or uniform speeds as may be required or desired for the efficient operation of the crane or other machine of which the mechanism I have described may form a part. It is obvious that by use of the springs P, I am enabled to shift from one speed adjustment of my lever A to any other desired speed adjustment for operation of the endless traction members. I note also that the member A is a single controlling device for the purposes for which it is employed, namely, to obtain the various operating speeds of the endless traction members whether uniform or different.

It will be apparent that the connection established by means of the yoke C, the ring D and the yoke lever G—I, is a sort of universal connection between the lever A and the pinion K of the shaft L. Additionally, there is what might be characterized as a swiveling connection between the ring D and the yoke lever G—I.

Having thus described my invention, what I claim as new and desire to secure by Letters Patent, is:

1. In steering control means for cranes, in combination, traction base means, a rotary car body mounted thereon, a center pin connection between the two, a steering control device on the rotary car body, traction speed control devices mounted on the traction base means, operative connections between said steering control device and traction speed control devices, comprising a lever pivoted to the rotary car body, a lever pivoted to the traction base means, a rotative operating connection between the said two levers permitting transmission of motion from one to the other in any relative position assumed thereby while moving with the parts on which the levers are mounted, clutch levers mounted on the traction base means, and connecting means intermediate said clutch levers and the previously mentioned lever which is carried by the traction base means whereby motion may be transmitted from the said lever to the clutch shifting levers, said connection comprising a rocking counter shaft, a sector carried thereby, a shifting lever actuating shaft, and a pinion on the said last mentioned shaft engaging said sector.

2. In a crane, traction driving mechanism comprising change speed gearing, levers for effecting change speed action of said gearing, operating rods connected to said levers, a shaft and operating head on said shaft having separate pivotal connections with said rods, control mechanism for rotating said shaft, including a rack, a pinion on the shaft engaged by said rack, a lever to move the rack, together with a turn table mounted on said traction base, and control means operable from the turn table for shifting the lever having the rack.

In testimony whereof I affix my signature.

ERICH H. LICHTENBERG.